United States Patent
Pollard et al.

(10) Patent No.: US 7,317,557 B2
(45) Date of Patent: Jan. 8, 2008

(54) PAPER-TO-COMPUTER INTERFACES

(75) Inventors: Stephen Bernard Pollard, Uley Nr Dursley (GB); Maurizio Pilu, Bristol (GB); David Arthur Grosvenor, Bristol (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 1158 days.

(21) Appl. No.: 10/206,350

(22) Filed: Jul. 29, 2002

(65) Prior Publication Data

US 2003/0025951 A1 Feb. 6, 2003

(30) Foreign Application Priority Data

Jul. 27, 2001 (GB) .................................. 0118434.0

(51) Int. Cl.
*H04N 1/40* (2006.01)
*H04N 1/04* (2006.01)
*H04N 1/46* (2006.01)

(52) U.S. Cl. ...................... 358/448; 358/498; 358/474; 358/505

(58) Field of Classification Search ................ 358/448, 358/474, 505, 497, 1.9, 498, 100, 462.11, 358/462.14; 382/100; 235/462.11, 462.14
See application file for complete search history.

(56) References Cited

U.S. PATENT DOCUMENTS 6,081,261 A * 6/2000 Wolff et al. .................. 345/179
6,753,977 B2 * 6/2004 Hoover ........................ 358/1.9
7,110,619 B2 * 9/2006 Frohlich et al. ............. 382/292
2003/0081014 A1 * 5/2003 Frohlich ...................... 345/856
2003/0082505 A1 * 5/2003 Frohlich et al. ............. 434/180
2003/0103238 A1 * 6/2003 MacLean et al. ........... 358/1.18
2004/0193697 A1 * 9/2004 Grosvenor et al. .......... 709/217

FOREIGN PATENT DOCUMENTS

EP 0 622 722 A2 * 4/1994
WO 95/34046 12/1995

* cited by examiner

*Primary Examiner*—Houshang Safaipour

(57) ABSTRACT

The present invention provides an apparatus and method which facilitates the use of a printed or scribed document as an interface with a computer. The apparatus in one aspect comprises: a printed or scribed document bearing specialized calibration marks, the document being positioned on a work surface; a camera focused on the document for generating video signals representing the document in electronic form; and a processor linked to the camera for processing an image captured by the camera and configured to identify the calibration marks of the document in the captured image and then determine from the location of the calibration marks in the image a transformation between co-ordinates of features in the image and corresponding co-ordinates of features in the document that compensates for the freely variable positioning of the document on the work surface.

19 Claims, 4 Drawing Sheets

PAPER-TO-COMPUTER INTERFACES

FIELD OF THE INVENTION

The present invention relates to a method and apparatus for facilitating the use of a printed or scribed document, as an interface with a computer.

BACKGROUND OF THE INVENTION

Over the decades since electronic computers were first invented, office practices have become dominated by them and information handling is now very heavily based in the electronic domain of the computer. The vast majority of documents are prepared, adapted, stored and even read in electronic form on computer display screens. Furthermore, in parallel to this, the computer interface technology has advanced from there being a predominantly physical interface with the computer using punched cards, keypads or keyboards for data entry—to the extensive present-day reliance on use of cursor moving devices such as the mouse for interacting with the screen-displayed essentially electronic interface known as the Graphical User Interface (GUI) that is in use universally in applications such as Windows®. The Graphical User Interface can be regarded as a virtual interface comprising operator key icons that replace the pushbutton keys of a physical keyboard.

The drive towards handling documents electronically and also representing hardware computer interfaces in a predominantly electronic form has been relentless since, amongst other obvious benefits, software implementations of hardware occupy no space and may be many orders of magnitude cheaper to produce. Nevertheless, electronic versions of documents and virtual interfaces do not readily suit the ergonomic needs of all users and uses. For some tasks, reading included, paper-based documents are much more user friendly than screen-based documents. Hard copy paper versions of electronic documents are still preferred by many for proof-reading or general reviews, since they are of optimally high resolution and flicker-free and less liable to give the reader eye-strain, for example.

In recent years the Xerox Corporation have been in the vanguard of developments to better integrate beneficial elements of paper based documents with their electronic counterpart. In particular they have sought to develop interface systems that heighten the level of physical interactivity and make use of computers to enhance paper-based operations.

Their European patent EP 0,622,722 describes a system in which an original paper document lying on a work surface is monitored by an overhead camera linked to a processor/computer to monitor the user's interaction with text or images on the paper document. An action such as pointing to an area of the paper document can be used to select and manipulate an image taken by the camera of the document and the image or a manipulated form of it is then projected back onto the work surface as a copy or modified copy. The Xerox interactive copying system is suited to this rôle but is not optimally compact, cost efficient and well adapted for other paper-based activities than document copying and modification.

One desirable type of paper-based interaction would be to print out a list of Internet search results and read through these on paper and to then use the printed paper to select an Internet page to be printed or displayed by simply pointing at the relevant area on the printed page. Aspects of such a use for paper-based computer interaction are further discussed in the present applicant's co-pending UK patent application.

Existing systems such as the aforementioned Xerox interactive copying system are not suited to such uses.

SUMMARY OF THE INVENTION

According to a first aspect of the present invention there is provided an apparatus which facilitates the use of a printed or scribed document as an interface with a computer and which comprises:

a said printed or scribed document bearing specialised calibration marks, the document being positioned on a work surface;

a camera focused on the document for generating video signals representing the document in electronic form; and a processor linked to the camera for processing an image captured by the camera and configured to identify the calibration marks of the document in the captured image and then determine from the location of the calibration marks in the image a transformation between co-ordinates of features in the image and corresponding co-ordinates of features in the document that compensates for the freely variable positioning of the document on the work surface.

a camera focused on the document for generating video signals representing the document; and a processor linked to the camera for processing an image captured by the camera and configured to identify the calibration marks of the document in the captured image and to then determine from the location of the calibration marks in the image a transformation between co-ordinates of features in the image and co-ordinates of corresponding features in the document.

The specialised calibration marks on the document and which are recognised by the processor are specialised in the sense that they are distinct and readily distinguishable from the textual or graphic image information that otherwise constitutes the primary information content of the document. An example would be a cross or bulls-eye target as opposed to a letter of the alphabet if the primary information content of the document is text.

Suitably the processor holds in a memory information concerning the content of the document at specified co-ordinates of the document.

Preferably the memory holds a reference version electronic image of the document.

Suitably the document is further marked with a symbol which identifies the document page. This symbol could, at the simplest level, be merely a page number in numerical, letter or alphanumerical form but suitably identifies the wider document context—e.g. which brochure—as well as the number of the specific page. The symbol is preferably a machine readable code, and particularly preferably a bar code such as a two dimensional bar code.

In the context of marking the document page with a page identification symbol it is further preferred that the memory holds information on the co-ordinates where the page identification symbol is expected to be found on the document, such that once the processor has determined the correspondence between co-ordinates of the image and co-ordinates of the document, the co-ordinates within the image at which the symbol should be found may be processed to more rapidly locate and determine the identity of the document page. This may be of lesser importance where the symbol is in the readily recognisable machine readable form of a bar code but nevertheless speeds up the process of document page recognition.

Particularly preferably at least three calibration marks are provided on the document, being configured in an L-form if there are only three of them, or in a rectangle if there are four of them.

Suitably at least one of the calibration marks has the form of a target comprising a plurality of concentric rings or a bulls-eye with at least one concentric ring.

Particularly advantageously at least one of the calibration marks has a different form from the other calibration mark(s).

The document page identification symbol is preferably a bar code.

According to a second aspect of the present invention there is provided a method of using a printed or scribed document as an interface with a computer, which method comprises:

providing a said printed or scribed document bearing calibration marks, and a camera focused on the document for generating video signals representing in electronic form image information present within the field of view of the camera and a processor linked to the camera;

capturing an image of the document with the camera; and, with the processor, identifying the calibration marks of the document in the captured image and then determining from the location of the calibration marks in the image a transformation between co-ordinates of features in the image and corresponding co-ordinates of features in the document.

According to a third aspect of the present invention there is provided a printed or scribed document bearing two or more visible and widely spaced apart specialised calibration marks thereon, configured for use in the aforementioned apparatus.

According to a fourth aspect of the present invention there is provided a method of preparing a printed document bearing specialised calibration marks as aforementioned which method comprises:

providing a processor for preparing a printed document linked to a printer and having a memory holding data which dictates the form of the specialised calibration marks; and with the processor and printer, printing two or more said calibration marks on to a sheet to produce the printed document.

Particularly suitably the processor and printer print the calibration marks onto the sheet at substantially the same time as printing the primary information content of the document onto the sheet.

Advantageously the calibration marks are printed on the sheet in the margins outside of the primary information content of the printed document.

According to a yet further aspect of the present invention there is provided an apparatus for preparing the aforementioned printed document, wherein the apparatus comprises a processor for preparing a printed document linked to a printer and having a memory holding data which dictates the form of the specialised calibration marks, the processor being configured for printing of the calibration marks together with the primary information content of the printed document.

BRIEF DESCRIPTION OF THE DRAWINGS

A preferred embodiment of the present invention will now be more particularly described, by way of example, with reference to the accompanying drawings, wherein.

DESCRIPTION OF THE PREFERRED EMBODIMENT

Figure 1:
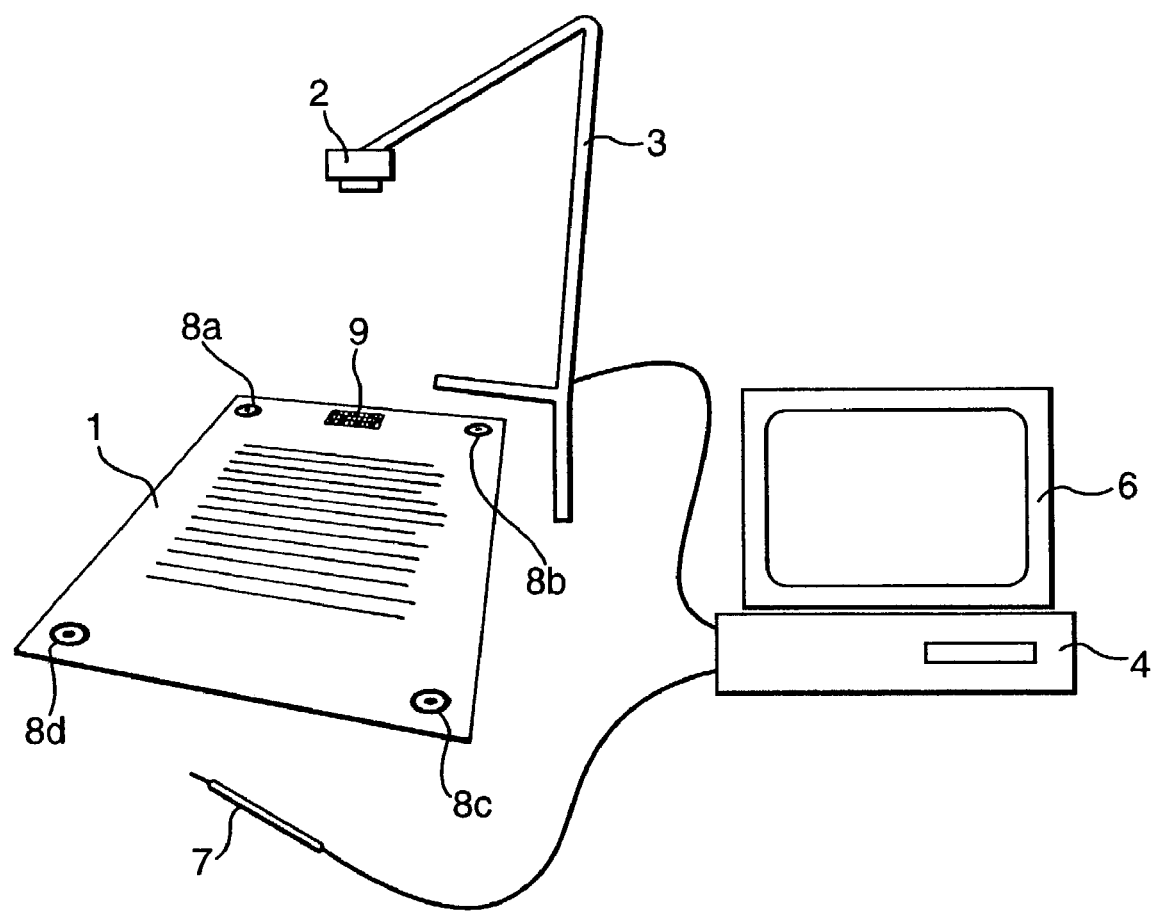
FIG. 1 is a simple system architecture diagram.

Referring firstly to FIG. 1, this illustrates an embodiment of the system of the present invention, as set up for operation. The system/apparatus comprises, in combination, a printed or scribed document 1, which might, for example, be a sheet of paper that is a printed page from a holiday brochure, positioned on a work surface (eg. a desk/table top that is suitably flat) facing upwardly; a video camera 2 that is held above the document 1 by a stand 3 and focuses down on the document 1; a processor/computer 4 to which the camera 2 is linked, the computer suitably being a conventional PC having an associated VDU/monitor 6; and a pointer 7 with a pressure sensitive tip and which is linked to the computer 4.

The document 1 is freely variably positioned on the work surface—it is not placed on the work surface in a pre-defined position and orientation dictated by guides or markings on the work surface but can be at any location and angle of orientation that is flat and face-up on the work surface within the field of view of the camera 2. The user placing the document 1 on the work surface may have rotated the document 1 through any angle about an axis perpendicular to the work surface/document 1. He need not have placed it in alignment with himself or the apparatus.

To compensate for the freely variable positioning of the document, the document 1 differs from a conventional printed brochure page in that firstly it bears a set of four widely spaced apart and prominently visible specialised calibration marks 8a-8d, one mark 8a-d proximate each corner of the page in the margins and outside of the primary information content of the page; secondly, it has a two-dimensional bar code which serves as a readily machine-readable page identifier mark 9 and which is located in the margin at the top of the document 1 substantially centrally between the top edge pair of calibration marks 8a, 8b.

The calibration marks 8a-8d are position reference marks that are designed to be easily differentiable and localisable by the processor of the computer 4 in the electronic images of the document 1 captured by the overhead camera 2.

Figure 3:
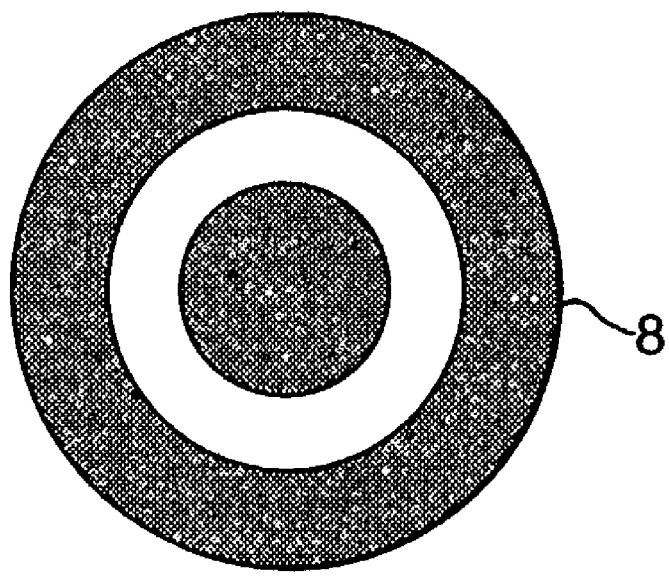
FIG. 3 is a close-up plan view of one of the calibration marks.
Figure 4:
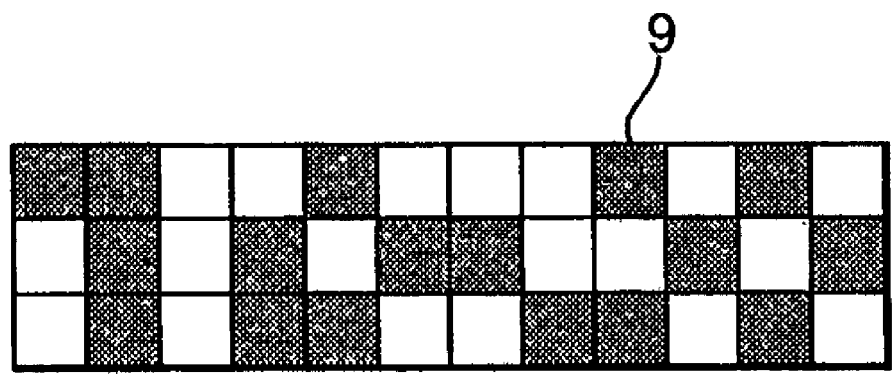
FIG. 4 is a close-up plan view of the page identification mark comprising a two-dimensional bar code.

The illustrated calibration marks 8a-8d are simple and robust, each comprising a black circle on a white background with an additional black circle around it as shown in FIG. 3. This gives three image regions that share a common centre (central black disc with outer white and black rings). This relationship is approximately preserved under moderate perspective projection as is the case when the target is viewed obliquely.

It is easy to robustly locate such a mark 8 in the image taken from the camera 2. The black and white regions are made explicit by thresholding the image using either a global or preferably a locally adaptive thresholding technique. Examples of such techniques are described in:

Gonzalez R. & Woods R. Digital Image Processing, Addison-Wesley, 1992, pages 443-455; and Rosenfeld A. & Kak A. Digital Picture Processing (second edition), Volume 2, Academic Press, 1982, pages 61-73.

After thresholding, the pixels that make up each connected black or white region in the image are made explicit using a component labelling technique. Methods for performing connected component labelling/analysis both recursively and serially on a raster by raster basis are described in: Jain R., Kasturi R. & Schunk B. Machine Vision, McGraw-Hill, 1995, pages 4247 and Rosenfeld A. & Kak A. Digital Picture Processing (second edition), Volume 2, Academic Press, 1982, pages 240-250.

Such methods explicitly replace each component pixel with a unique label.

Black components and white components can be found through separate applications of a simple component labelling technique. Alternatively it is possible to identify both black and white components independently in a single pass through the image. It is also possible to identify components implicitly as they evolve on a raster by raster basis keeping only statistics associated with the pixels of the individual connected components (this requires extra storage to manage the labelling of each component).

In either case what is finally required is the centre of gravity of the pixels that make up each component and statistics on its horizontal and vertical extent. Components that are either too large or too small can be eliminated straight off. Of the remainder what we require are those which approximately share the same centre of gravity and for which the ratio of their horizontal and vertical dimensions agrees roughly with those in the calibration mark 8. An appropriate black, white, black combination of components identifies a calibration mark 8 in the image. Their combined centre of gravity (weighted by the number of pixels in each component) gives the final location of the calibration mark 8.

Figure 2:
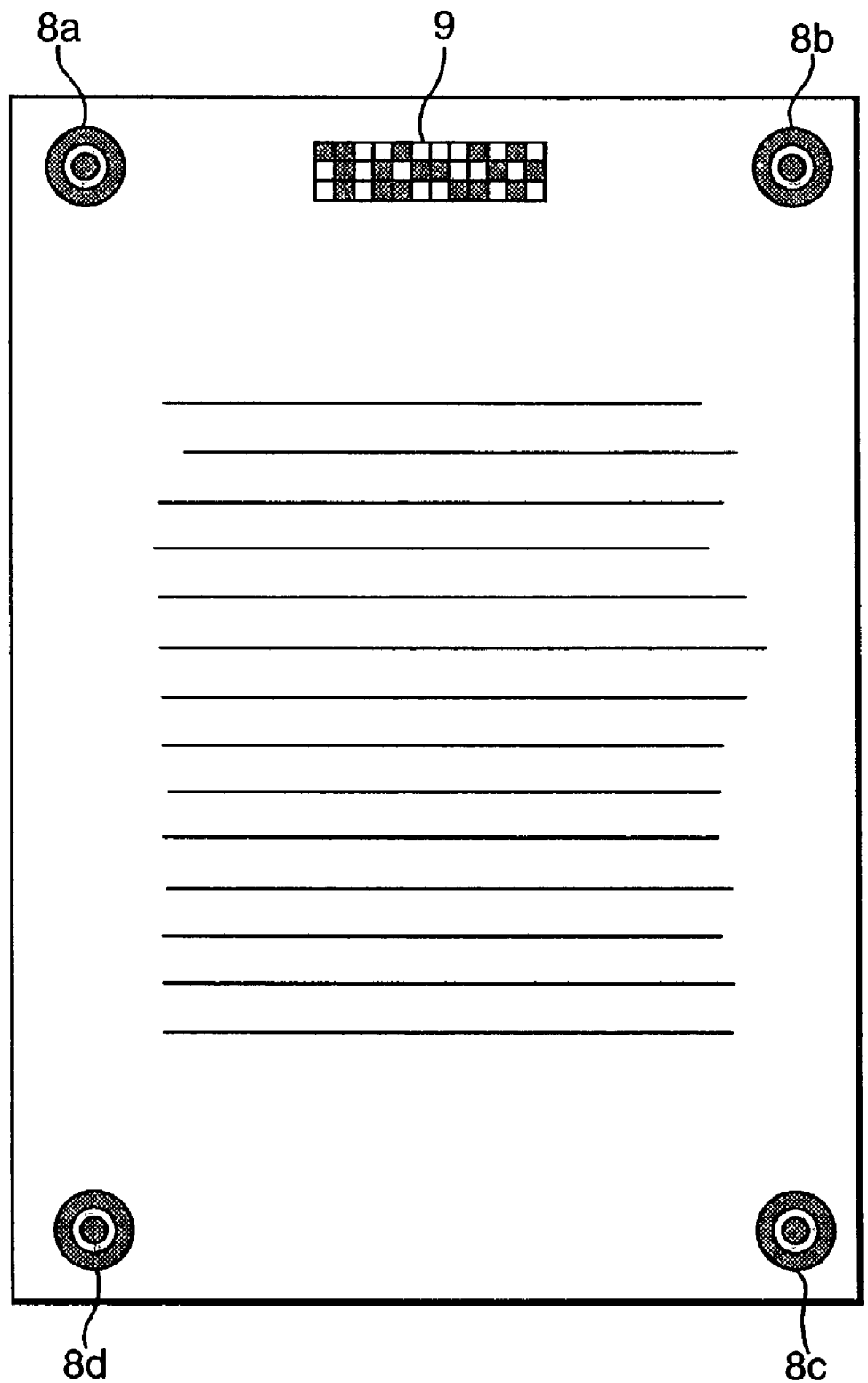
FIG. 2 is a plan view of a printed paper document with calibration marks and a page identification mark.

The minimum physical size of the calibration mark 8 depends upon the resolution of the sensor/camera 2. Typically the whole calibration mark 8 must be more than about 60 pixels in diameter. For a 3MP digital camera 2 imaging an A4 document there are about 180 pixels to the inch so a 60 pixel target would cover $\frac{1}{3}^{rd}$ of an inch. It is particularly convenient to arrange four such calibration marks 8a-d at the corners of the page to form a rectangle as shown in the illustrated embodiment of FIG. 2.

For the simple case of fronto-parallel (perpendicular) viewing it is only necessary to correctly identify two calibration marks 8 in order to determine the location and orientation of the documents and thereby compensate for the freely variable positioning of the documents. These can also be used to determine the scale of the document. Whereas for a camera 2 with a fixed viewing distance the scale of the document 1 is also fixed, in practice the thickness of the document, or pile of documents, affects the viewing distance and, therefore, the scale of the document.

In the general case the position of two known calibration marks 8 in the image is used to compute a transformation from image co-ordinates to those of the document 1 (e.g. origin at the top left hand corner with the x and y axes aligned with the short and long sides of the document respectively). The transformation is of the form:

$$\begin{bmatrix} X' \\ Y' \\ 1 \end{bmatrix} = \begin{bmatrix} k\cos\theta & -\sin\theta & t_x \\ \sin\theta & k\cos\theta & t_y \\ 0 & 0 & 1 \end{bmatrix} \begin{bmatrix} X \\ Y \\ 1 \end{bmatrix}$$

Where (X, Y) is a point in the image and (X', Y') is the corresponding location on the document (1) with respect to the document page co-ordinate system. For these simple 2D displacements the transform has three components: an angle θ a translation $(t_x, t_y)$ and an overall scale factor k. These can be computed from two matched points and the imaginary line between them using standard techniques (see for example: HYPER: A New Approach for the Recognition and Positioning of Two-Dimensional Objects, IEEE Trans. Pattern Analysis and Machine Intelligence, Volume 8, No. 1, January 1986, pages 44-54).

With just two identical calibration marks 8a, 8b it may be difficult to determine whether they lie on the left or right of the document or the top and bottom of a rotated document 1 (or in fact at opposite diagonal corners). One solution is to use non-identical marks 8, for example, with different numbers of rings and/or opposite polarities (black and white ring order). This way any two marks 8 can be identified uniquely.

Alternatively a third mark 8 can be used to disambiguate. Three marks 8 must form an L-shape with the aspect ratio of the document 1. Only a 180 degree ambiguity then exists for which the document 1 would be inverted for the user and thus highly unlikely to arise.

Where the viewing direction is oblique (allowing the document 1 surface to be non-fronto-parallel or extra design freedom in the camera 2 rig) it is necessary to identify all four marks 8a-8d in order to compute a transformation between the viewed image co-ordinates and the document 1 page co-ordinates.

The perspective projection of the planar document 1 page into the image undergoes the following transformation:

$$\begin{bmatrix} x \\ y \\ w \end{bmatrix} = \begin{bmatrix} a & b & c \\ b & e & f \\ g & h & 1 \end{bmatrix} \begin{bmatrix} X \\ Y \\ 1 \end{bmatrix}$$

Where X'=x/w and Y'=y/w.

Once the transformation has been computed then it can be used for a range of purposes which may include firstly assisting in locating the document page identifier bar code 9 from expected co-ordinates for its location that may be held in a memory in or linked to the computer 4. The computed transformation can also be used to map events (e.g. pointing) in the image to events on the page (in its electronic form).

Figure 5:
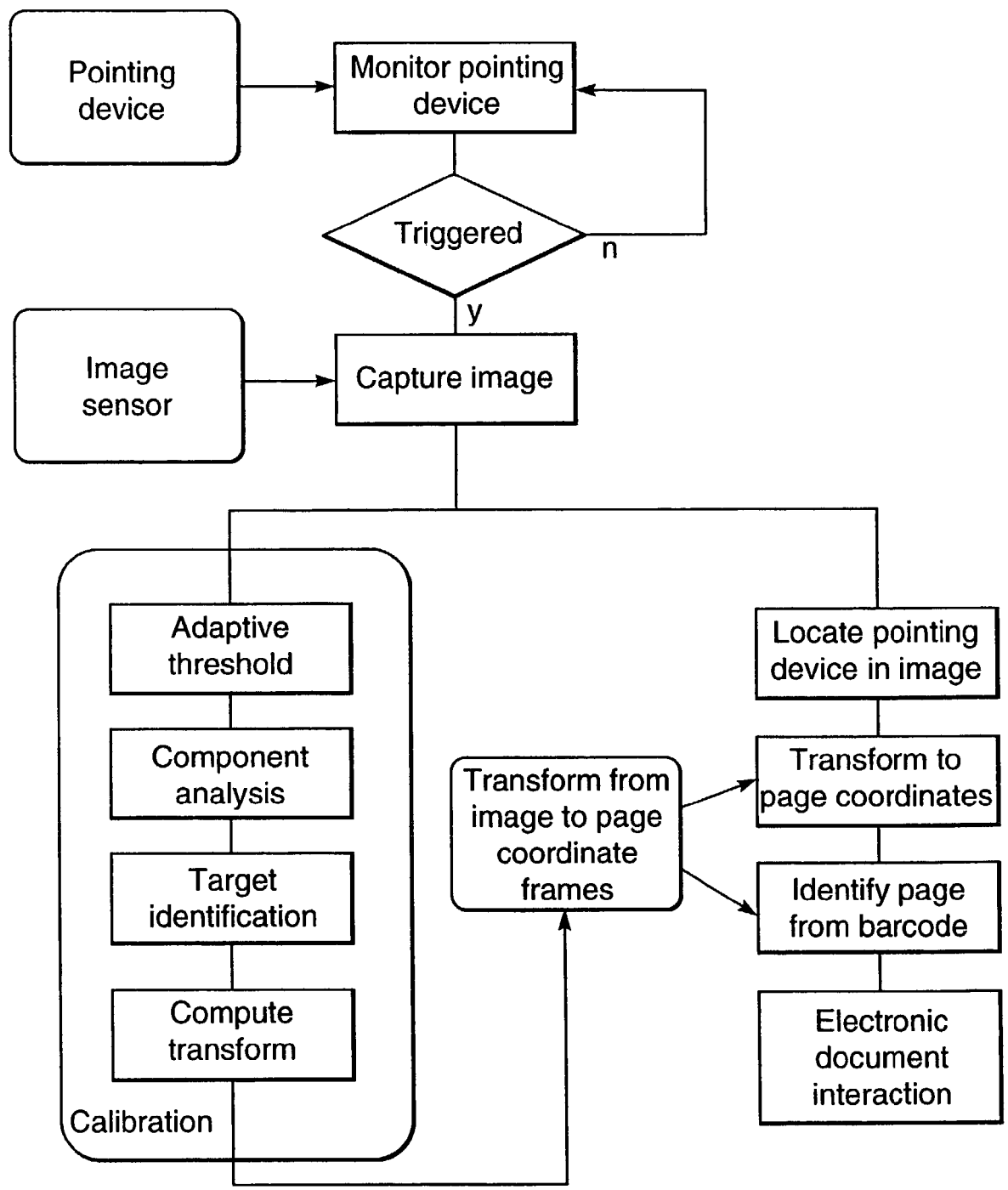
FIG. 5 is a flow chart demonstrating the operation of the system.

The flow chart of FIG. 5 shows a sequence of actions that are suitably carried out in using the system and which is initiated by triggering a switch associated with a pointing device 7 for pointing at the document 1 within the field of view of the camera 2. The triggering causes capture of an image from the camera 2, which is then processed by the computer 4

As noted above, in the embodiment of FIG. 1 the apparatus comprises a tethered pointer 7 with a pressure sensor at its tip that may be used to trigger capture of an image by the camera 2 when the document 1 is tapped with the pointer 7 tip. This image is used for calibration, calculating the mapping from image to page co-ordinates; for page identification from the bar code 9; and to identify the current location of the end of the pointer 7.

The calibration and page identification operations are best performed in advance of mapping any pointing movements in order to reduce system delay.

The easiest way to identify the tip of the pointer 7 is to use a readily differentiated and, therefore, readily locatable and identifiable special marker at the tip. However, other automatic methods for recognising long pointed objects could be made to work. Indeed, pointing may be done using the operator's finger provided that the system is adapted to recognise it and respond to a signal such as tapping or other distinctive movement of the finger or operation of a separate switch to trigger image capture.

The apparatus described above enables efficient use of the printed or scribed document 1 as an interface with the computer 4 for instructing the computer to call up any of a range of different screen displays or for a multitude of other functions which may be initiated simply by placing the document 1 under the camera 2, or by placing the document 1 under the camera 2 and pointing to an area of the document 1 that the computer 4 will recognise as having a computer action or linkage associated with it.

The calibration marks 8a-8d and suitably also the page identification mark/bar code 9 are best printed onto the document 1 substantially at the same time as the primary information content of the document 1 (i.e. its text/pictorial or other informational content) is printed. The document 1 with the calibration markings 8 and identification marking 9 is suitably prepared in a computer such as computer 4 and with an editor in the computer 4 configuring the layout of the calibration marks 8 and bar code 9 relative to the primary information content of the document before exporting the formatted data to a printer for printing. Direct association of the calibration marks 8 and page identification mark 9 with the information to be printed before the document is printed out enables the relationship between the marks 8, 9 and the primary information content of the document 1 to be properly controlled and configured and, furthermore, enables information about the configuration relationship to be embedded in the printed document 1, for example in the bar code 9. This latter facility may be of particular use when the printed document 1 is a modified version of the document as originally held in the computer 4 prior to printing out. The electronic version of the document that is held for initial printing may be of any printable form (provided it is WYSIWYG) that may, for example, be a web page, a Word or Excel document or a PDF file.

Importantly, when some documents are printed—for example, HTML web pages—the layout of the printed document is substantially different to that on screen. For web pages the format varies with the parameters of the browser used to view it. By embedding in the markings 8, 9 on the printed document 1 details of the relationship between the geometry of the physical form of the printed document and the electronic material that generated it, this information can be retrieved when the printed document 1 is used as an interface with a computer 4 in order to link the printed document 1 to the underlying electronic information.

Although in the present invention it is preferred that the printed document 1 has both calibration marks 8 and a page identification mark 9, in an alternative embodiment the computer 4 may be programmed to recognise the printed document 1 by other attributes of the document 1 such as, for example, paragraph layout. A page identification mark such as a bar code 9 does, however, represent a particularly efficient basis for page recognition and is also useful for imparting further information such as the above-mentioned mapping link between the geometry of the physical form of the printed document and the electronic material that generated it.

In preparing the printed document 1 additional information may be included in the document 1 such as, for example, the identity of the user or system by which the document is printed as well as any further useful information.

The invention claimed is:

1. An apparatus which facilitates the use of a printed or scribed document as an interface with a computer and which comprises:
    a. a work surface configured to receive a printed or scribed document bearing specialized calibration marks, the document being freely, variably and arbitrarily positioned on the work surface;
    b. a camera for focusing on the document for generating video signals representing the document in electronic form; and
    c. a processor linked to the camera for processing an image captured by the camera and configured to identify specialized calibration marks of the document in the captured image and then determine from the location of the specialized calibration marks in the image a transformation between co-ordinates of features in the image and corresponding co-ordinates of features in the document, and that compensates for the positioning of the document on the work surface.

2. An apparatus as claimed in claim 1, wherein the printed or scribed document is positioned flat on the work surface at an angle of orientation on the work surface that is freely and arbitrarily variable and the processor is configured to determine from the location of the specialized calibration marks in the image a transformation between co-ordinates of features in the image and corresponding co-ordinates of features in the document that compensates for the angle of orientation of the document.

3. An apparatus as claimed in claim 2, wherein the processor is configured to determine a transformation of the form:

$$\begin{bmatrix} X' \\ Y' \\ 1 \end{bmatrix} = \begin{bmatrix} k\cos\theta & -\sin\theta & t_x \\ \sin\theta & k\cos\theta & t_y \\ 0 & 0 & 1 \end{bmatrix} \begin{bmatrix} X \\ Y \\ 1 \end{bmatrix}.$$

4. An apparatus as claimed in claim 1, wherein the printed or scribed document may be positioned on the work surface in an oblique position relative to the camera and the processor is configured to determine from the location of the specialized calibration marks in the image a transformation between co-ordinates of features in the image and corresponding co-ordinates of features in the document that compensates for a said oblique position of the document.

5. An apparatus as claimed in claim 1 which holds in a memory information concerning the content of the document at specified co-ordinates of the document.

6. An apparatus as claimed in claim 1, wherein the document is further marked with a symbol which identifies the document page.

7. An apparatus as claimed in claim 6, wherein the document page identification symbol is a machine-readable code.

8. An apparatus as claimed in claim 7, wherein the document page identification symbol is a bar code.

9. An apparatus as claimed in claim 5, wherein the document is further marked with a symbol which identifies the document page, and wherein the memory holds information on the co-ordinates where a page identification symbol is to be found on the document, such that once the processor has determined the correspondence between co-ordinates of the image and co-ordinates of the document, the co-ordinates within the image at which the symbol should be found may be processed to determine the identity of the document page.

10. An apparatus as claimed in claim 1, wherein four spaced apart calibration marks are provided on the document.

11. An apparatus as claimed in claim 10 wherein the specialized calibration marks are in the form of a rectangle, one approximately at each respective corner of the document.

12. An apparatus as claimed in claim 1 wherein at least one of the specialized calibration marks has the form of a target comprising a plurality of concentric rings or a bulls-eye with at least one concentric ring.

13. An apparatus as claimed in claim 1 wherein at least one of the specialized calibration marks has a different form from the other calibration mark(s).

14. A method of using a printed or scribed document as an interface with a computer, which method comprises:
 a. providing said printed or scribed document bearing specialized calibration marks on a work surface that is capable of receiving the printed or scribed document in a freely, variable and arbitrary position, and a camera focused on the document for generating video signals representing the document in electronic form and a processor linked to the camera for processing an image captured by the camera and configured to identify the specialized calibration marks of the document in the captured image and then determine from the location of the specialized calibration marks in the image a transformation between co-ordinates of features in the image and corresponding co-ordinates of features in the document that compensates for positioning of the document on the work surface;
 b. capturing an image of the document with the camera; and
 c. identifying, by the processor, the specialized calibration marks of the document in the captured image and then determining, from the location of the specialized calibration marks in the image, the transformation between co-ordinates of features in the image and corresponding co-ordinates of features in the document that compensates for the positioning of the document on the work surface.

15. A processor for use in an apparatus which facilitates the use of a printed or scribed document as an interface with a computer, the processor being programmed for processing an image captured by a camera of a printed or scribed document bearing specialized calibration marks and freely, variably and arbitrarily positioned on a work surface to identify the specialized calibration marks of the document in the captured image and then determine from the location of the specialized calibration marks in the captured image a transformation between co-ordinates of features in the captured image and corresponding co-ordinates of features in the document that compensates for the positioning of the document on the work surface.

16. A method for facilitating the use of a printed or scribed document, the method comprising the steps of:
 processing an image captured by a camera of a printed or scribed document bearing specialized calibration marks and freely variably and arbitrarily positioned on a work surface to identify the specialized calibration marks of the document in the captured image; and
 determining, from the location of the specialized calibration marks in the captured image, a transformation between co-ordinates of features in the captured image and corresponding co-ordinates of features in the document that compensates for the positioning of the document on the work surface.

17. An apparatus which facilitates the use of a printed or scribed document as an interface with a computer and which comprises:
 a. a work table configured to receive a printed or scribed document bearing specialized calibration marks, the document being freely, variably and arbitrarily positioned on the work table;
 b. a camera mounted on a stand viewing down over the work table for focusing on the document for generating video signals representing the document in electronic form; and
 c. a processor linked to the camera for processing an image captured by the camera and configured to identify the specialized calibration marks of the document in the captured image and then determine from the location of the specialized calibration marks in the image a transformation between co-ordinates of features in the image and corresponding co-ordinates of features in the document, and that compensates for the positioning of the document on the work surface.

18. An apparatus as claimed in claim 17, wherein the printed or scribed document is positioned flat on the work surface at an angle of orientation on the work surface that is freely and arbitrarily variable and the processor is configured to determine from the location of the specialized calibration marks in the image a transformation between co-ordinates of features in the image and corresponding co-ordinates of features in the document that compensates for the angle of orientation of the document.

19. An apparatus as claimed in claim 18, wherein the processor is configured to determine a transformation of the form:

$$\begin{bmatrix} X' \\ Y' \\ 1 \end{bmatrix} = \begin{bmatrix} k\cos\theta & -\sin\theta & t_x \\ \sin\theta & k\cos\theta & t_y \\ O & O & 1 \end{bmatrix} \begin{bmatrix} X \\ Y \\ 1 \end{bmatrix}.$$

* * * * *